(12) United States Patent
Hasenkamp et al.

(10) Patent No.: US 8,191,695 B2
(45) Date of Patent: Jun. 5, 2012

(54) ACTUATING MECHANISM FOR ENGAGING AND DISENGAGING A SEPARATING CLUTCH, WITH ROTATABLE CAM SEGMENT

(75) Inventors: Jan Hasenkamp, Flein (DE); Kuno Fronius, Lauffen (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 588 days.

(21) Appl. No.: 12/399,890

(22) Filed: Mar. 6, 2009

(65) Prior Publication Data
US 2010/0187067 A1    Jul. 29, 2010

(30) Foreign Application Priority Data
Mar. 6, 2008  (DE) .................... 10 2008 013 054

(51) Int. Cl.
*F16D 23/12* (2006.01)
*F16D 28/00* (2006.01)
(52) U.S. Cl. .......... 192/20; 192/48.2; 192/48.8; 192/83; 192/84.6; 192/93 R; 192/99 S
(58) Field of Classification Search .................. 192/20, 192/48.2, 48.8, 83, 84.6, 99 S, 93 R
See application file for complete search history.

(56) References Cited

U.S. PATENT DOCUMENTS

| | | | | |
|---|---|---|---|---|
| 1,463,445 A | * | 7/1923 | Smith | 74/363 |
| 6,938,507 B2 | * | 9/2005 | Fisher | 74/89.16 |
| 7,150,348 B2 | * | 12/2006 | Peppard et al. | 192/99 S |

FOREIGN PATENT DOCUMENTS
DE        102 35 906        2/2004
(Continued)

OTHER PUBLICATIONS

Wagner, et al. *Electromotoric actuators for double clutch transmissions-Best efficiency by itself*, pp. 138-153, LuK Symposium 2006.

*Primary Examiner* — David D Le
*Assistant Examiner* — Jacob S Scott
(74) *Attorney, Agent, or Firm* — Knobbe, Martens, Olson & Bear LLP

(57) ABSTRACT

The invention relates to an actuating mechanism for engaging and disengaging a separating clutch of a single-clutch or multiple-clutch transmission, which has a housing, for a motor vehicle, having: an actuating drive; a cam segment which has a curved recess and which is rotatable about a first bearing, said first bearing being fixed with respect to the housing, and which can be rotated by the actuating drive in an engagement rotational direction or a disengagement rotational direction; and an engagement fork which is rotatable about a second bearing, said second bearing being fixed with respect to the housing, and which is coupled at one side of the fork to the cam segment by means of a cam follower and which can be coupled on an opposite side of the fork to the separating clutch in such a way that the separating clutch is closed in the event of a rotation of the cam segment in the engagement rotational direction and the separating clutch is opened in the event of a rotation of the cam segment in the disengagement rotational direction. The cam follower engages into the curved recess and being guided by a contour of the curved recess in the event of a rotation of the cam segment; with the contour being shaped such that the cam follower is offset in a radial direction of the cam segment in the event of an actuation of the actuating drive (FIG. 1).

25 Claims, 12 Drawing Sheets

FOREIGN PATENT DOCUMENTS

| | | |
|---|---|---|
| DE | 10 2007 003 338 | 8/2007 |
| WO | WO 2004/044448 | 5/2004 |
| WO | WO 2007/034208 | 3/2007 |
| WO | WO 2007/096212 | 8/2007 |

* cited by examiner

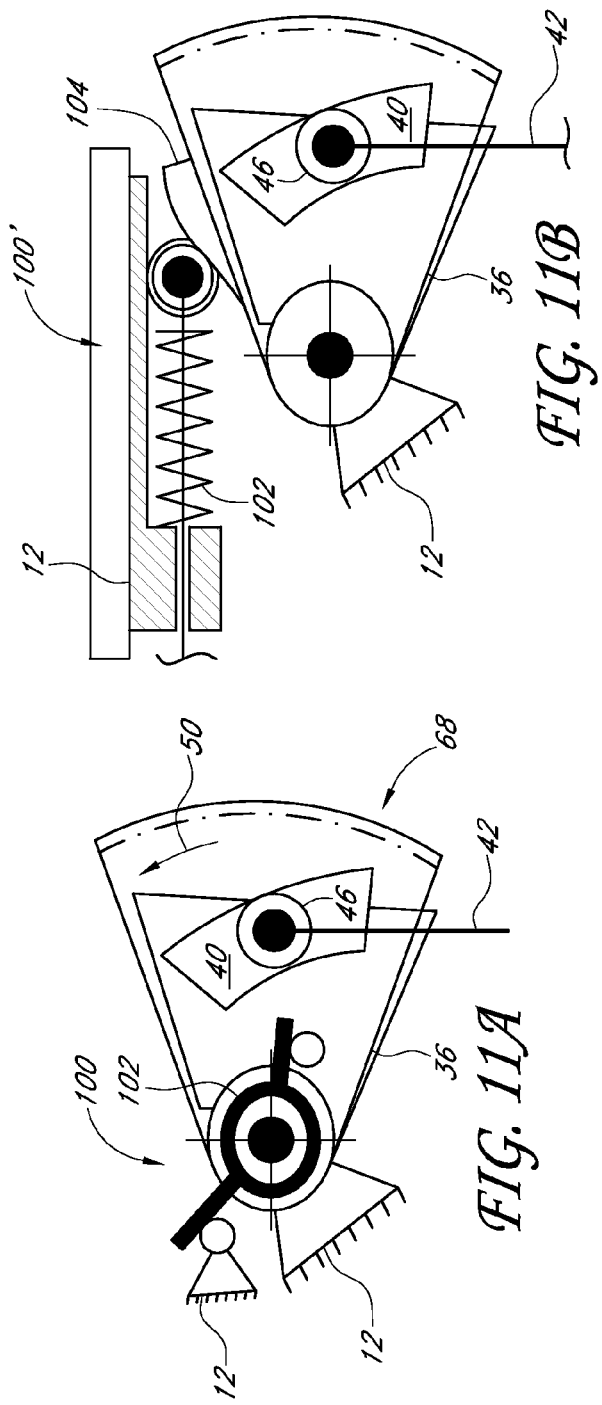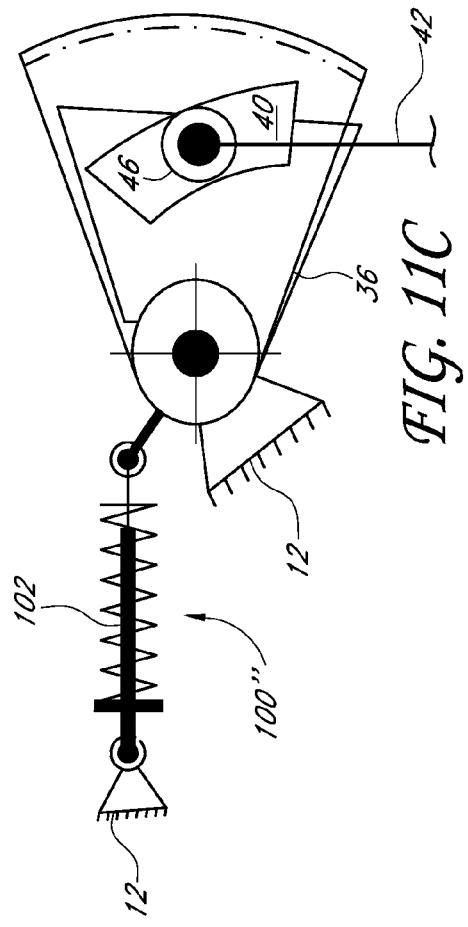

ACTUATING MECHANISM FOR ENGAGING AND DISENGAGING A SEPARATING CLUTCH, WITH ROTATABLE CAM SEGMENT

CROSS-REFERENCE TO RELATED APPLICATIONS

This application claims the benefit and priority to German Application Number DE 10 2008 013 054.0 filed on Mar. 6, 2008. The disclosure of the above-referenced application is hereby expressly incorporated by reference in its entirety.

BACKGROUND OF THE INVENTION

The present invention relates to an actuating mechanism for engaging and disengaging a separating clutch of a single-clutch or multiple-clutch transmission, which has a housing, for a motor vehicle.

RELATED PRIOR ART

Various concepts for engaging and disengaging separating clutches by means of actuator arrangements are known.

A first concept, which is based on rotary slide valves, is described in WO 2007/096212 A1. A problem in said solution is a large hysteresis effect and friction, which are caused by an eccentric introduction of force and high force components which act transversely with respect to an engagement bearing direction of action.

A further problem is, for example, that conventional actuating drives project out of a transmission housing to a considerable extent, which makes it difficult for such actuating drives to be used in in-line applications and transmissions with a front-transverse layout.

A further concept is described in the article "Elektromotorische Aktuatorik für Doppelkupplungsgetriebe—Bester Wirkungsgrad aus eigenem Antrieb" ["Electromotive actuating arrangement for dual-clutch transmission—best efficiency from a separate drive"] (LuK colloquium 2006, pages 136 to 143). Said article presents an actuator whose structure extends radially away from a transmission input shaft and which presses by means of a recirculating ball against an engagement lever of the clutch so as to close the latter. Here, the engagement lever runs in an oblique plane. To permit self-opening of the clutch, the clutch is preloaded in the disengagement direction. An electric motor must be supplied with power at all times when the clutch is to be held closed. Also, the actuating drives of the actuating units project out of the transmission housing to a considerable extent, which is critical with regard to the available installation space, in particular in in-line applications.

A further dual-clutch actuator arrangement is described in document DE 10 2007 003 338 A1. The actuator arrangement shown in said document likewise has a large installation space requirement, such that the integration of said actuator arrangement is likewise difficult from a spatial aspect.

SUMMARY OF THE INVENTION

It is therefore an object of the present invention to provide an actuating mechanism which can be used universally for single clutches and dual clutches and wherein the installation space requirement is extremely small. It is intended in particular to provide low friction values. The actuating mechanism should preferably have a low power or energy requirement. It would also be desirable to use as few components as possible, such that the actuator arrangement can generally be of a simpler design.

Said object is achieved by means of an actuating mechanism for engaging and disengaging a separating clutch of a single-clutch or dual-clutch transmission, which has a housing and is suitable for use in a motor vehicle, with the actuating mechanism comprising: an actuating drive; a cam segment; an engagement fork; and a cam follower which is connected to the engagement fork. The cam segment has a curved recess. Said cam segment is rotatable about a first bearing, said first bearing being fixed with respect to the housing, and can be rotated by the actuating drive in an engagement rotational direction or a disengagement rotational direction. The engagement fork is rotatable about a second bearing, said second bearing being fixed with respect to the housing. Said engagement fork is coupled at one side thereof to the cam segment by means of the cam follower. On the opposite side of the fork, the latter is coupled to the separating clutch in such a way that the separating clutch is closed in the event of a rotation of the cam segment in the engagement rotational direction and is opened in the event of a rotation of the cam segment in the disengagement rotational direction. The cam follower engages into the curved recess. The cam follower is guided by a contour of the curved recess in the event of a rotation of the cam segment. The contour is shaped such that the cam follower is offset in a radial direction of the cam segment in the event of an actuation of the actuating drive.

The actuating mechanism of the present invention has the advantage that it is of simple design. Few components are required for engaging or disengaging the clutch. The actuating mechanism can be installed both in single clutches and also in dual clutches, but in duplicate in the latter case. The actuating mechanism may be used with wet clutches or with dry clutches.

The actuating mechanism of the present invention is very small in structure. The actuating drive may be integrated tangentially into the transmission housing and therefore projects out of the housing only to an insignificant extent, if at all, in the radial direction with respect to the separating clutch axis. This is advantageous in particular in in-line applications and transmissions with a front-transverse layout, where the available installation space, in particular in the radial direction, is extremely restricted. Transmissions for in-line applications in particular are often integrated into sparsely-dimensioned transmission tunnels, which is possible without problems with the actuating mechanism according to the invention.

It is also advantageous if the recess of the cam segment runs substantially in a circumferential direction of the cam segment and has a varying radius.

By means of said measure, it is ensured that, in the event of a rotation of the cam segment about its bearing, the engagement fork is rotated about its bearing in order to engage or disengage the clutch.

In particular, the recess has a contact flank which, when the actuating mechanism is installed in a transmission, is in contact with the cam follower on account of a preload of the separating clutch, which preload acts in a disengagement direction of the separating clutch.

Said measure has the effect that the cam follower bears substantially at all times against the contact flank of the cam segment. With expedient selection of the shape of the contact flank, it is possible for the actuating moment required for rotating the cam segment at certain times of the movement process, for example when the engaged position is reached, to be influenced in any desired manner, with the actuating moment, for example, being (additionally) increased shortly before the engagement point is reached.

According to one preferred embodiment, the contact flank substantially has a cross section in the shape of a section of an, in particular Archimedes, spiral.

The derivation of the mathematical function for a spiral in cylindrical coordinates with respect to a rotational angle Phi then results in a constant. This means that the force exerted on the separating clutch is exerted in a constant fashion. There is therefore a linear relationship between the rotational angle of the cam segment and the translatory movement, radially with respect to the cam segment, which the cam follower approximately follows. It is self-evident that other spiral shapes, such as for example a logarithmic spiral or the like, may be used in order to provide a model for the shape of the contact flank.

In a further refinement of the invention, the contact flank has a continuous operating section, with the operating section having, in the region of its one end, an engagement point and, in the region of its other end, a disengagement point.

It is also advantageous if the contact flank has, in the region of the engagement point, a convexity which preferably has a constant radius (in the reference system of the cam segment).

If the cam segment is rotated to an excessive extent in the engagement rotational direction, that is to say the cam follower overshoots the engagement point, the force to be exerted on the separating clutch to hold the separating clutch in the engaged state can be reduced. The energy requirement for applying the holding force is therefore reduced. The actuating mechanism is generally subjected to a reduced loading, which results in a reduced amount of wear. In particular, the motor of the actuating drive is less highly loaded than before. Less energy is consumed.

According to a further refinement, a flank section with an elevation adjoins the operating section in the disengagement direction, with the flank section with an elevation subsequently merging into a locking section.

With a correspondingly designed contact flank, it is possible to realize a parking lock function, in particular in the case of a dual-clutch transmission. The cam follower is "pushed over" in the region of the engagement point, in that said cam follower must overcome the elevation in the flank so as to then latch into a type of additional convexity. In said case, in a dual-clutch transmission, two gears are engaged, which is possible in the rest state of the transmission. If the transmission is then acted on with a torque, the entire transmission is braced. A movement of the transmission and of the drivetrain is therefore not possible. Said mode of operation may be utilized to securely stop a motor vehicle in the rest state, that is to say in particular when said motor vehicle is to be parked.

According to a further embodiment, the actuating mechanism also has a force compensation device which imparts an assisting force or an assisting moment to one or more components of the mechanism. It is possible in particular for an assisting moment to be imparted to the cam segment, which moment ideally increases with increasing travel in the engagement direction, in order to compensate the increasing force for actuating the clutch.

By means of said measure, the force which must be applied to engage the clutch is reduced. Said force is conventionally imparted solely by the motor of the actuating drive. With corresponding force compensation, the force to be imparted by the motor is reduced. As the clutch is disengaged, it is correspondingly necessary for a force to be applied counter to the force compensation device, which force is however imparted substantially by the clutch itself, in particular by the plate springs thereof, since the clutch is preferably preloaded in the disengagement direction.

In a further preferred refinement, the force compensation device has a spring element which is preloaded counter to the disengagement rotational direction and which can be coupled at its one end to the housing and at its opposite end to the cam segment or to the fork.

The spring serves as a force store in order to be able to call upon the assisting force during the engagement process. During disengagement, the assisting force is stored in the spring once again.

It is also advantageous if a rising elevation is provided in an outer surface of the cam segment in order to exert the greatest possible force on the cam segment in the region of the engagement point in the event of a rotation in the engagement rotational direction.

The assisting force is therefore increased once again in particular in the region of the engagement point, where the greatest forces must be applied in order to engage the clutch, and said assisting force therefore assists the motor of the actuating drive, which is thereby relieved of load.

It is also advantageous if the cam follower is a fork roller which is preferably rotatably fixed between two prongs of the fork and whose diameter is selected such that the fork roller can be moved with a predefined degree of play along the contact flank in the curved recess.

It is also advantageous if the actuating drive has a motor, in particular an electric motor, and a brake.

Once the clutch is engaged, the motor is conventionally responsible for providing the required holding force. If a brake is now provided, it is possible for the holding force to be applied by the motor to be considerably reduced. Tests have shown that currents of the order of magnitude of a maximum of 40 A are required for imparting the holding force by means of the motor. In contrast, for the same applied holding force, an interposed brake requires a current which is lower by up to one order of magnitude, such that the energy consumption can be further considerably reduced by providing a brake.

It is also advantageous if the actuating drive also has an intermediate gearing, in particular a planetary gear set or spur gear mechanism, and a pinion.

The use of a planetary gear set permits a compact design of the actuating drive. This is because it is possible to realize large transmission ratios within a small installation space. This is also achieved in that no additional bearing points need be provided on the transmission housing for the internal elements of the intermediate gearing (planetary gear set). It is also possible for the actuating drive to be designed as a slim cylindrical unit. The two latter reasons also make it possible for the actuating drive to be mounted on the transmission housing in an advantageous and simple manner.

The use of a spur gear mechanism permits a reduction of the axial installation space, since the step-down gearing stages may be arranged in parallel. As a result, however, the actuating drive tends to require more radial installation space, that is to say the actuating drive becomes wider. However, this may be advantageous if more installation space is available in the radial region than in the axial region.

According to a further preferred embodiment, the brake is arranged in parallel with respect to the intermediate gearing by means of a spur toothing.

It is possible here, too, for the axial installation space of the actuating drive to be reduced, which may be advantageous depending on the situation of use in the gearing.

It is also advantageous if the cam segment is a circular segment whose circular arc has a toothing.

In this way, it is possible for the cam segment to be driven by means of a correspondingly toothed spindle (splined shaft) of the motor or by means of a gearwheel which is coupled to the motor.

According to a further advantageous refinement, the cam segment is connected to a Bowden cable which can be mechanically actuated from outside the housing.

Should a fault occur during the adjustment of the cam segment, such that the actuating drive is no longer capable of eliminating said fault by rotating the cam segment forward or backward, it is possible by means of the Bowden cable for the cam segment to be restored manually, in particular into the disengagement position. This is advantageous in particular in the embodiment in which the cam segment has an integrated parking lock function. Said feature represents a safety feature and serves to ensure unlocking in an emergency.

It is also advantageous if, in the installed state of the actuating mechanism, the actuating drive is arranged substantially in a radial direction relative to an actuation axle of the separating clutch.

Said measure permits a further reduction of the required installation space.

It is self-evident that the features specified above and the features yet to be explained below can be used not only in the respectively specified combination but rather also in other combinations or individually without departing from the scope of the present invention.

BRIEF DESCRIPTION OF THE DRAWINGS

Exemplary embodiments of the invention are illustrated in the drawing and are explained in more detail in the following description. In the drawings:

FIGS. 11a-c show three first variants of a force compensation device;

DETAILED DESCRIPTION OF THE INVENTION

Figure 1:
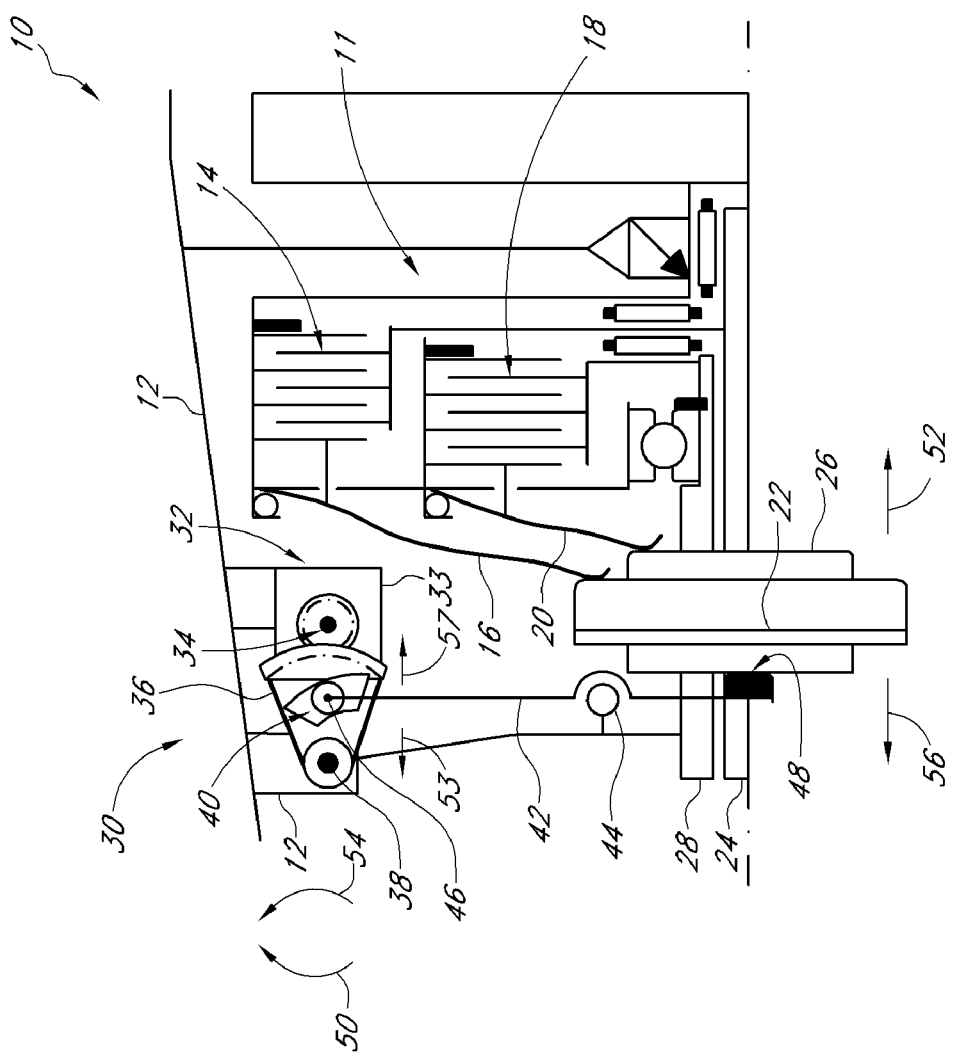
FIG. 1 shows an overview of a part of an exemplary dual-clutch transmission in which an actuating mechanism according to the present invention is installed.

In the following description of the figures, similar elements are provided with the same reference numerals. Where differences or modifications exist, these will be explained.

FIG. 1 shows a partial view of a dual-clutch transmission 10 in which the present invention is installed. The dual-clutch transmission 10 has a housing 12. The present invention is, however, not restricted to being installed in dual-clutch transmissions. The present invention may also be installed in single-clutch transmissions or clutches. The present invention is also suitable for use both in wet clutches and in dry clutches.

The dual-clutch transmission 10 of FIG. 1 has a first clutch 14 with a first plate spring 16. Also provided is a second clutch 18 with a second plate spring 20. The first clutch 14 and the second clutch 18 each constitute a separating clutch 11.

The first clutch 14 serves to actuate a first clutch engagement bearing 22. The first clutch engagement bearing 22 is connected by means of the plate spring 16 to the first clutch 14 and is preloaded in a disengagement direction by the plate spring 16. The first clutch engagement bearing 22 is mounted so as to be movable coaxially with respect to a first, inner driveshaft 24, such that a movement takes place in the axial direction of the shaft 24.

The second clutch 18 is connected by means of the second plate spring 20 to a second clutch engagement bearing 26 which is movably arranged on a second, outer driveshaft 28. The second driveshaft 28 is arranged coaxially with respect to the first, inner driveshaft 24.

The dual-clutch transmission 10 of FIG. 1 also has an actuating mechanism 30 according to the present invention. The actuating mechanism 30 comprises an actuating drive 32, a cam segment 36 and a clutch element, in particular an engagement fork 42.

The actuating drive 32 is mounted so as to be fixed with respect to the housing and may have a motor 33, in particular an electric motor. A drive output shaft of the motor 33 is coupled to a pinion 34. The pinion 34 is coupled to the cam segment 36, in particular by means of a meshing toothing. The cam segment 36 is rotatably connected in an articulated manner to a first bearing 38 which is fixed with respect to the housing. The rotational axis of the first bearing 38 is perpendicular to the plane of the drawing of FIG. 1. The cam segment 36 has a curved recess 40 which is formed so as to be continuous. It is self-evident that a groove may alternatively also be provided depending on the design of the fork 42 and of its cam follower 46. An inverse arrangement is also possible. The engagement fork 42 is rotatably connected in an articulated manner to a second bearing, or counterbearing 44, which is fixed with respect to the housing, and has the cam follower 46 at a first end. At an opposite end, the engagement fork 42 is in contact, in the installed state, with a force introduction point 48 of the first clutch engagement bearing 22.

The actuating mechanism 30 shown in FIG. 1 serves to actuate the first clutch 14. To actuate the second clutch 18, a further actuating mechanism is provided, which is not shown in the illustration of FIG. 1.

The actuating mechanism 30 which is shown is situated in a neutral position. To engage the engagement bearings 22, 24, the latter are offset axially in the direction (engagement direction) of an arrow 52, to the right in FIG. 1, by virtue of the cam segment 36 being rotated by means of the actuating drive 32 in an engagement rotational direction 50, in this case clockwise. The cam follower 46 then follows the recess 40. The cam follower moves radially inward with respect to the cam segment 36 during an engagement of the clutch, that is to say that part of the fork 42 which is situated above the counter-bearing 44 moves in the direction of the arrow 53, whereas that part of the fork 42 which is situated below the counter bearing 44 moves in the direction of the arrow 52.

With the opposite movement direction, the clutch is disengaged. For this purpose, the cam segment 36 is rotated in a disengagement rotational direction 54, in this case anti-clockwise. The lower part of the fork 42 then moves in a disengagement direction 56, in this case to the left. The upper part of the fork 42 then moves in the direction of the arrow 57, in this case to the right. Said movement is brought about in turn by the cam follower 46, which moves radially outward with respect to the cam segment 36 by following the correspondingly shaped recess 40.

Figure 2:
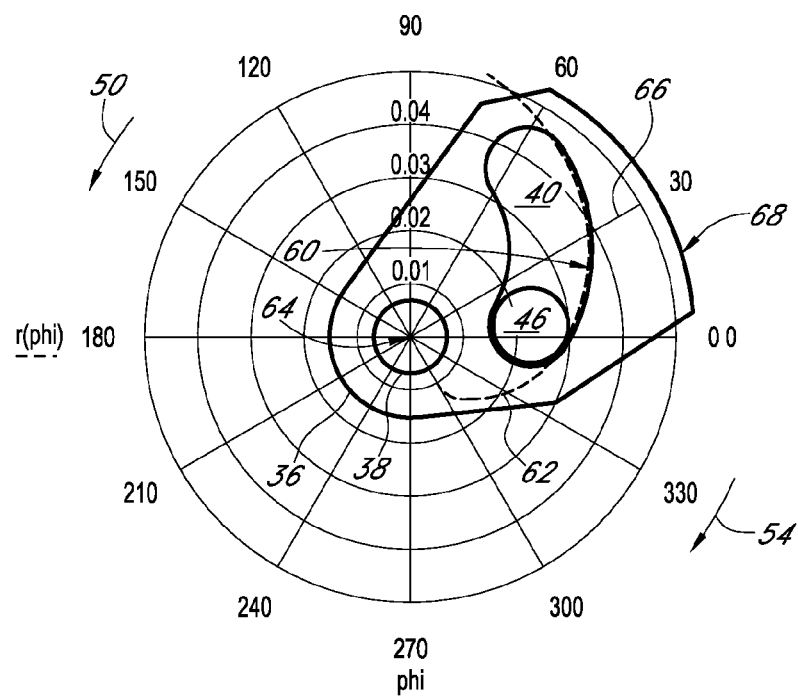
FIG. 2 shows the shape of a cam segment according to the present invention in cylindrical coordinates.

FIG. 2 shows the cam segment 36 from FIG. 1 on its own. The illustration is in the form of cylindrical coordinates, for which reason a full circle is shown around the contour of the cam segment 36, which circle is labelled with the angles from 0 to 330°. The recess 40 is tilted in relation to the recess 40 of FIG. 1 in such a way that the engagement rotational direction 50 is aligned anti-clockwise and the disengagement rotational direction 54 is aligned clockwise.

That inner surface of the recess 40 which is situated at the right-hand side in FIG. 2 constitutes a so-called contact flank 60. The cam follower 46, illustrated by means of a dashed line, is in contact with the contact flank 60 on account of the above-specified preload of the clutches by means of the plate springs 16, 20. It is self-evident that, in the case of a reversed preload, that is to say with a reversed orientation of the engagement direction 52 and of the disengagement direction 56 on account of the preload of the plate springs 16, 20, the contact surface 60 would be situated on the opposite flank (not shown here in any more detail) of the recess 40, which flanks is situated radially at the inside in FIG. 2.

The geometric size of the recess 40 is preferably selected such that the cam follower 46, with a predefined degree of play, does not become stuck in the recess. The fork roller can move virtually without friction within the recess 40.

The contact flank 60 substantially has the shape of a spiral curve 62, in particular of an Archimedes curve, in cross section. If the curve 62 is an Archimedes curve, this may be expressed by r(phi)=a·phi. Forming the derivation with respect to the angle phi results in the constant "a" for the Archimedes curve, that is to say the gradient of the contact flank 60 remains constant during a rotation of the cam segment 36. The engagement fork 42, and therefore also the engagement bearings 22, 26, are then moved continuously in the axial direction of the shafts 24, 28.

The cam segment 36 is rotated about an axis 64, which is perpendicular to the plane of the drawing of FIG. 2, of the bearing 38 which is fixed with respect to the housing. Shown at the radially outer edge of the cam segment 36 is a toothing 68, with a radial direction being indicated by means of a reference line 66.

FIG. 2 shows an engaged position of the cam segment 36 and of the cam follower 46. The cam follower 46 has migrated radially inward from its normal position (cf. FIG. 1). If the clutch is disengaged, then the cam segment 36 is rotated in the disengagement rotational direction 54, that is to say clockwise, proceeding from the position of FIG. 2, such that the cam follower 46 migrates radially outward.

Figure 3:
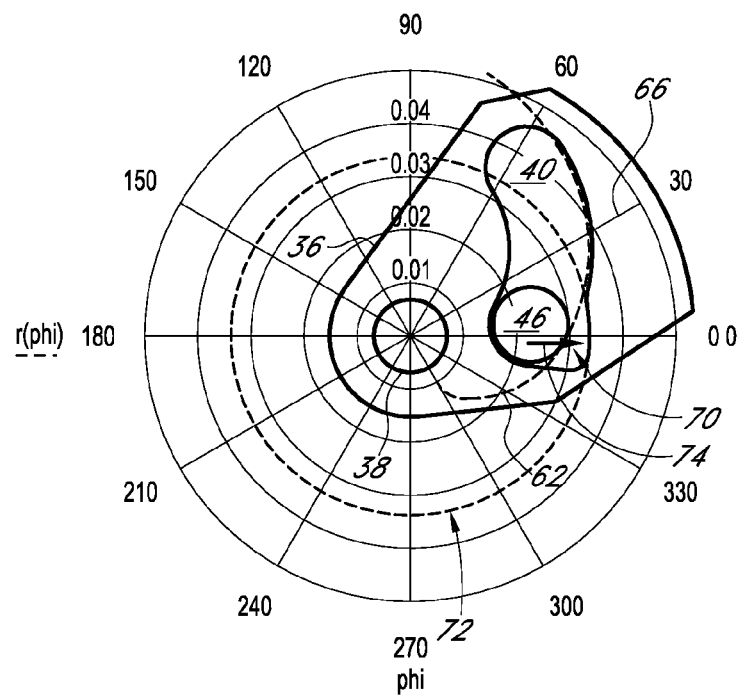
FIG. 3 shows a modification of the cam segment from FIG. 2.

FIG. 3 shows a modification of the cam segment 36 from FIG. 2, again in the engaged position.

The recess 40 or the contact flank 60 has a recess 70 in the region of the engaged position of the clutch. Here, the recess 70 or the flank thereof follows a circular arc of the reference circle 72, that is to say the radius does not change in the region of the further recess 70.

The cam follower 46, which is shown here again in the position of FIG. 2, can migrate radially outward on account of the preload of the clutch 11, as indicated by an arrow 74. The cam follower 46 now presses against the contact flank in such a way that there is no resulting reaction force in the tangential direction. In this way, the retaining force which must be imparted by the motor 33 in order to hold the clutch 11 in the engaged state is reduced. Here, it is assumed that, in the positions of the cam follower 46 shown in FIGS. 2 and 3, the clutch 11 has already been securely engaged and said clutch 11 has therefore already reliably overshot a so-called engagement point of the contact flank 60.

Therefore, by means of the further recess 70, the force which must conventionally be imparted by the actuating drive 32 to hold the clutch 11 in the engaged state is reduced since, with the embodiment of the contact flank 60 as per FIG. 3, the engagement bearing 22 can move slightly in the disengagement direction 56 (cf. FIG. 1). This permits a reduced energy consumption and in particular reduced fuel consumption if the actuating drive 32 is supplied with energy by means of fuel of the motor vehicle.

Figure 4:
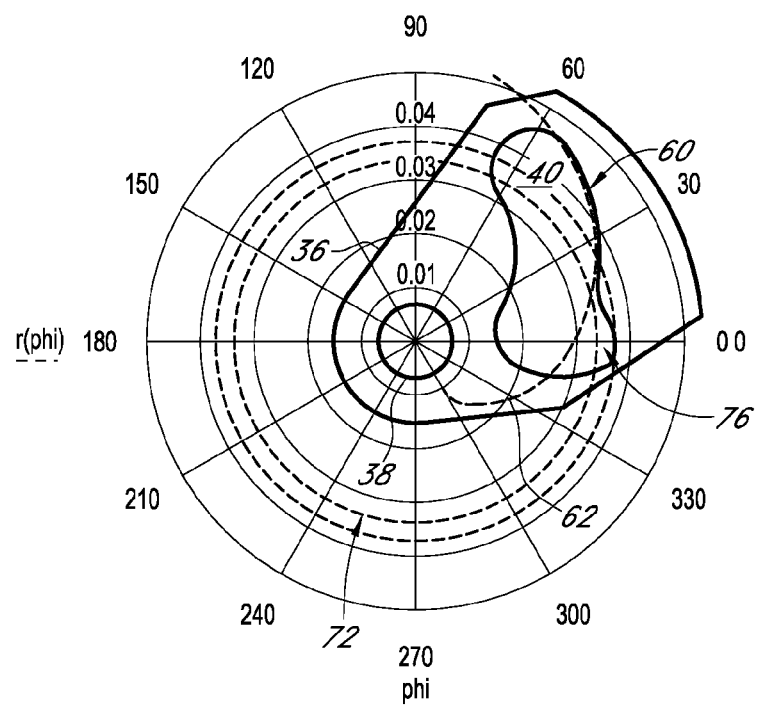
FIG. 4 shows a further modification of the cam segments from FIGS. 2 and 3.

FIG. 4 shows a further refinement of the cam segment 36, with the recess 40 having been additionally enlarged once again in the region of the engagement point in relation to the recess of FIG. 3, as indicated by an even larger convexity 76. It is possible to clearly see, in relation to the reference circle 72, that the shape of the contact flank 60 has been offset radially outward once again in relation to the reference circle 72.

In the case of a dual-clutch transmission, as shown by way of example in FIG. 1, it is possible and necessary for the cam segment 36 to be provided in duplicate in order to be able to actuate both clutches 14, 18. If both recesses 40 have the relatively large convexity 76, it is possible for both clutches to be engaged in said positions in order to be able to realize a parking lock function.

Figure 5:
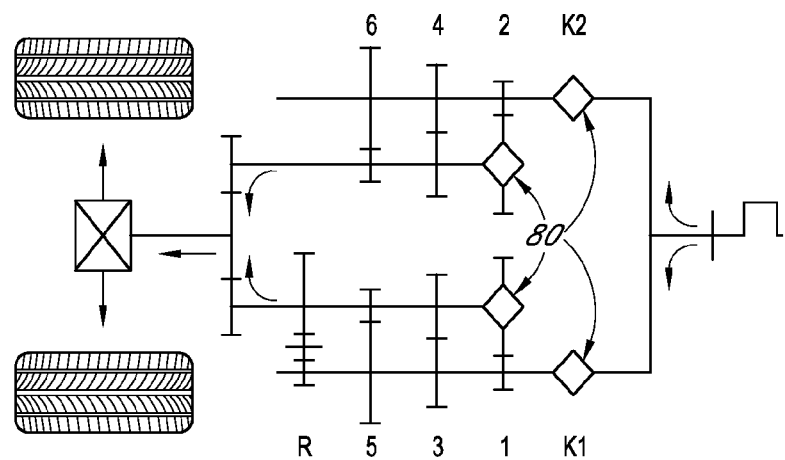
FIG. 5 shows a functional diagram for a dual-clutch transmission in the parking lock function.

A parking lock situation is shown by way of example in FIG. 5. Rhombuses 80 indicate closed clutch and transmission elements. FIG. 5 shows the two transmission strands of the dual-clutch transmission with the correspondingly numbered gears 1 to 6 and a reverse gear R. The clutches 14 and 18, which are provided in duplicate, are in each case closed. It is also the case here, by way of example, that the gears 1 and 2, that is to say in each case one gear of a transmission strand, are engaged. In this state, the drive wheels cannot move since, if one or both transmission strands were acted on with a torque, the entire transmission would be braced. It is possible in this way to realize a parking lock function. A corresponding situation applies to single clutches if only one gear is engaged.

The relatively large convexity 76 of the recess 40 of the cam segment 36, as shown in FIG. 4, ensures that the cam follower 46 (not illustrated in FIG. 4) cannot be directly moved out of its parking lock position.

For safety reasons, it may be necessary to enable the parking lock function, explained in connection with FIGS. 4 and 5, to also be manually unlocked. By way of example, this may be necessary in a situation in which a vehicle has been parked and must subsequently be moved away, wherein the actuating drive cannot or can no longer provide the required force, for example on account of a power failure or a failure of the on-board electrical system.

Figure 6:
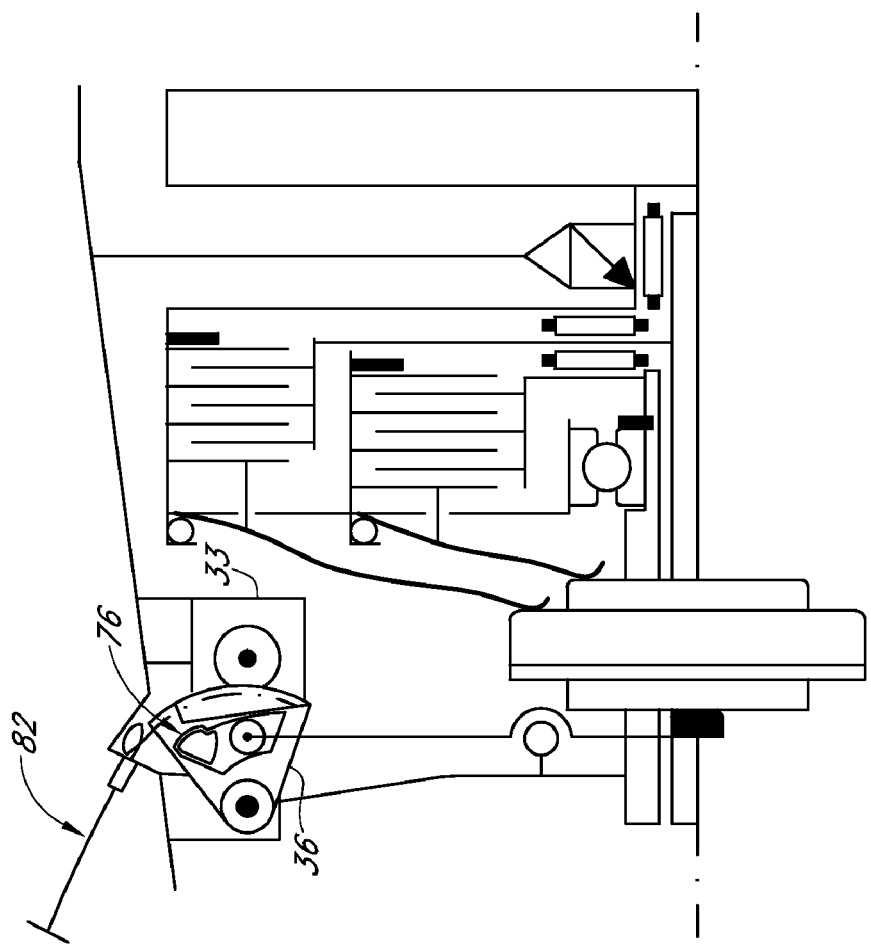
FIG. 6 shows a modification of the actuating mechanism from FIG. 1.

For this purpose, it is possible to use a Bowden cable 82 as provided in FIG. 6, which Bowden cable 82 is connected to the cam segment 36 and can be actuated from outside the transmission housing 12. It should be noted that FIG. 6 again shows the cam segment 36 from FIG. 1 with a further convexity 76, with the recess 40 again running from top left to bottom right and not, as is the case in connection with FIGS. 2 to 4, from top right to bottom left. It should also be noted that the recess 40 runs substantially in the circumferential direction of the cam segment.

Figure 7:
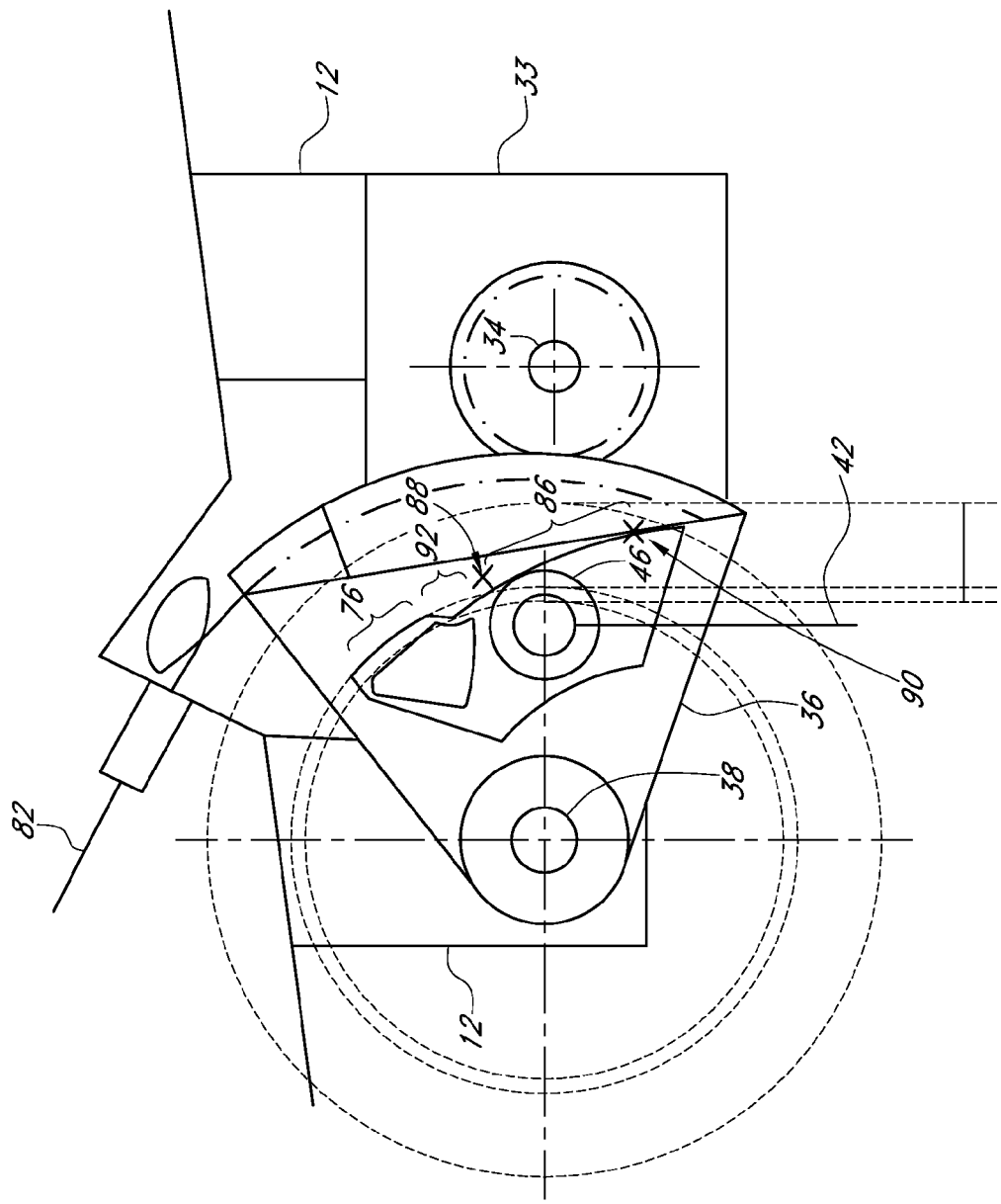
FIG. 7 shows a detailed illustration of the cam segment from FIG. 6.

The cam segment 36 from FIG. 6 is illustrated on a larger scale in FIG. 7.

FIG. 7 serves in particular to show different sections of the contact flank 60. The contact flank 60 is composed of an operating section 86, in this case a latching or locking region 76, and an interposed flank 92 with a corresponding elevation. The operating section 86 has, at its upper end in FIG. 7, the engagement point 88 and, at its lower end, the disengagement point 90. If the cam segment 36 is, rotated to an excessive extent in the engagement rotational direction 50, it is necessary to overcome a slight radial elevation in the flank section 92 in order to pass into the locking region 76. The pressure force is greater there than is necessary for completely closing the clutch. It is self-evident that the cam shapes of FIGS. 2 to 4 may be combined with one another in order to implement a plurality of functions.

Figure 8:
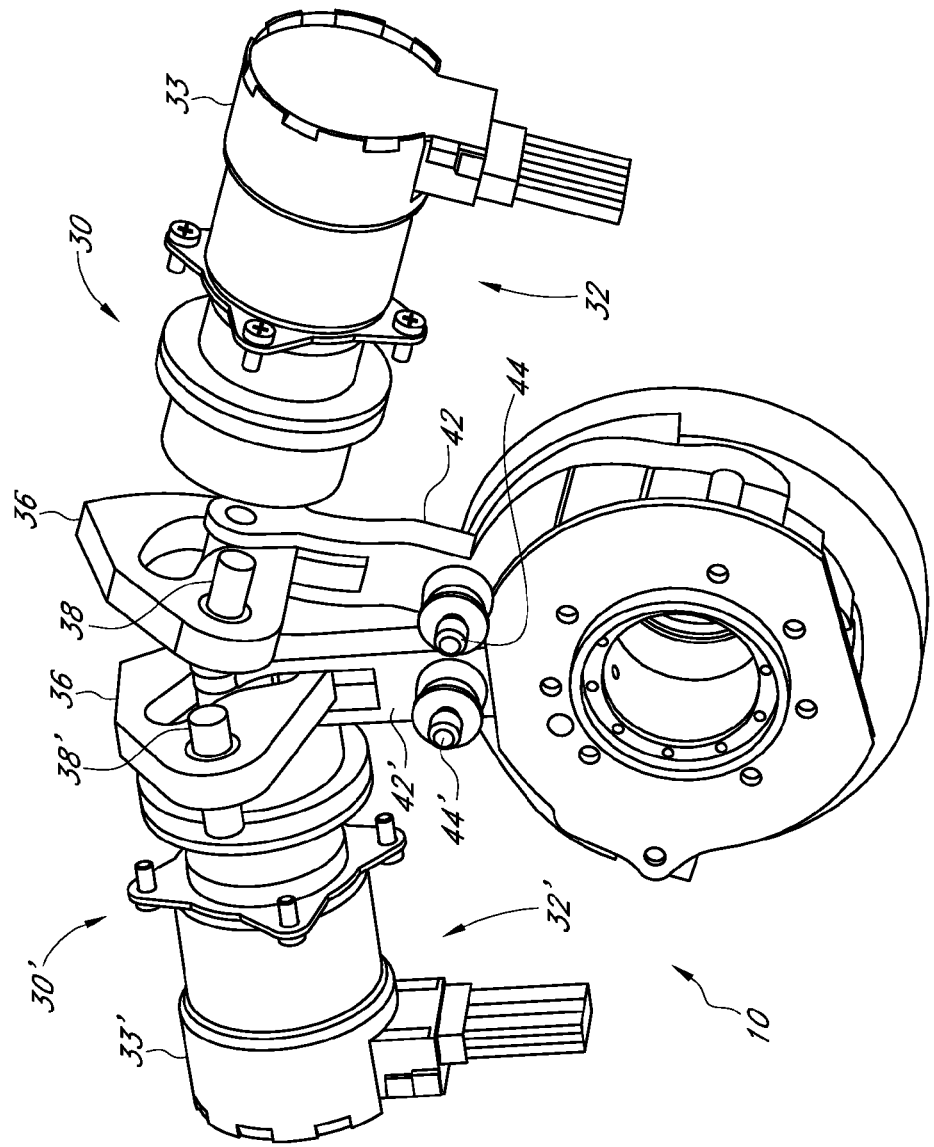
FIG. 8 shows an isometric view of an actuating mechanism according to the invention which is connected to an engagement bearing of a dual-clutch transmission.

FIG. 8 shows a perspective view of a part of the dual-clutch transmission 10 illustrated in FIG. 1. The provision of the actuating mechanism 30, 30' in duplicate, according to the present invention, can be clearly seen. The same applies to the cam segments 36, 36', the engagement forks 42, 42', the first bearings 38, 38' and the second bearings 44, 44'.

FIG. 8 clearly shows the compact design of the actuating mechanism in the dual-clutch application 10. The actuating drives 32, 32' are of short construction in the radial and tangential direction with respect to the driveshafts 24, 28 (not illustrated here). The axes of the drives 32, 32' may be arranged flexibly with respect to one another and, in FIG. 8, form an angle of approximately 160° with respect to one another. Angles of between 150° and 160° are preferable.

Figure 9:
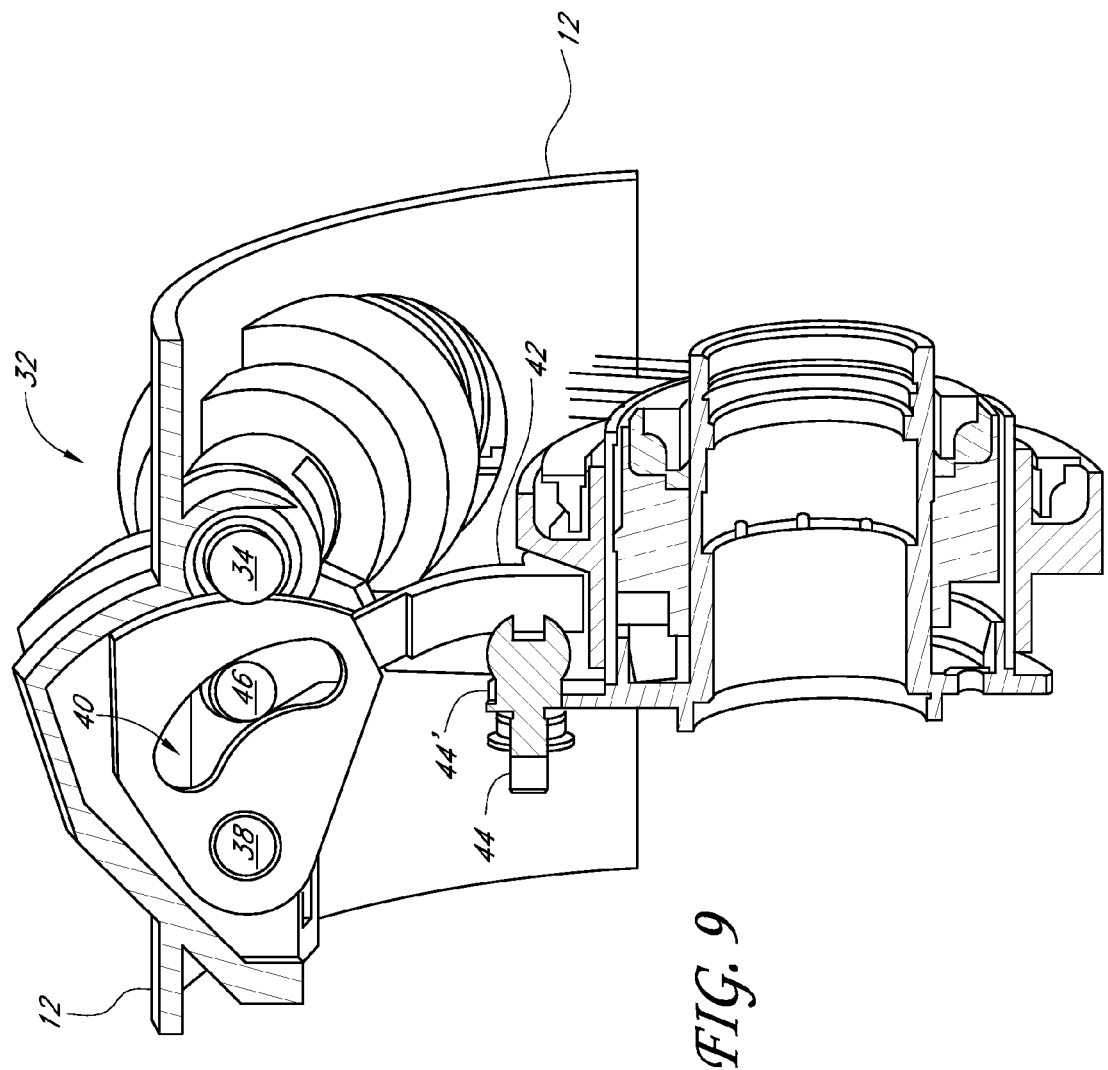
FIG. 9 shows a vertical section through FIG. 8, with a transmission housing also being illustrated.

FIG. 9 shows a perspective, sectioned view through the central plane of FIG. 8, where the two actuating mechanisms 30, 30' adjoin one another. It is also possible here to clearly see that the actuating drive 32 is well integrated into the additionally illustrated housing 12. The actuating mechanism 30 according to the present invention is of very compact construction, which promotes its use in transmissions which are used in in-line applications or transmissions in a front-transverse layout. A transmission designed in this way can be integrated in an effective and simple manner into the usually severely constricted transmission tunnel of motor vehicles.

Figure 10:
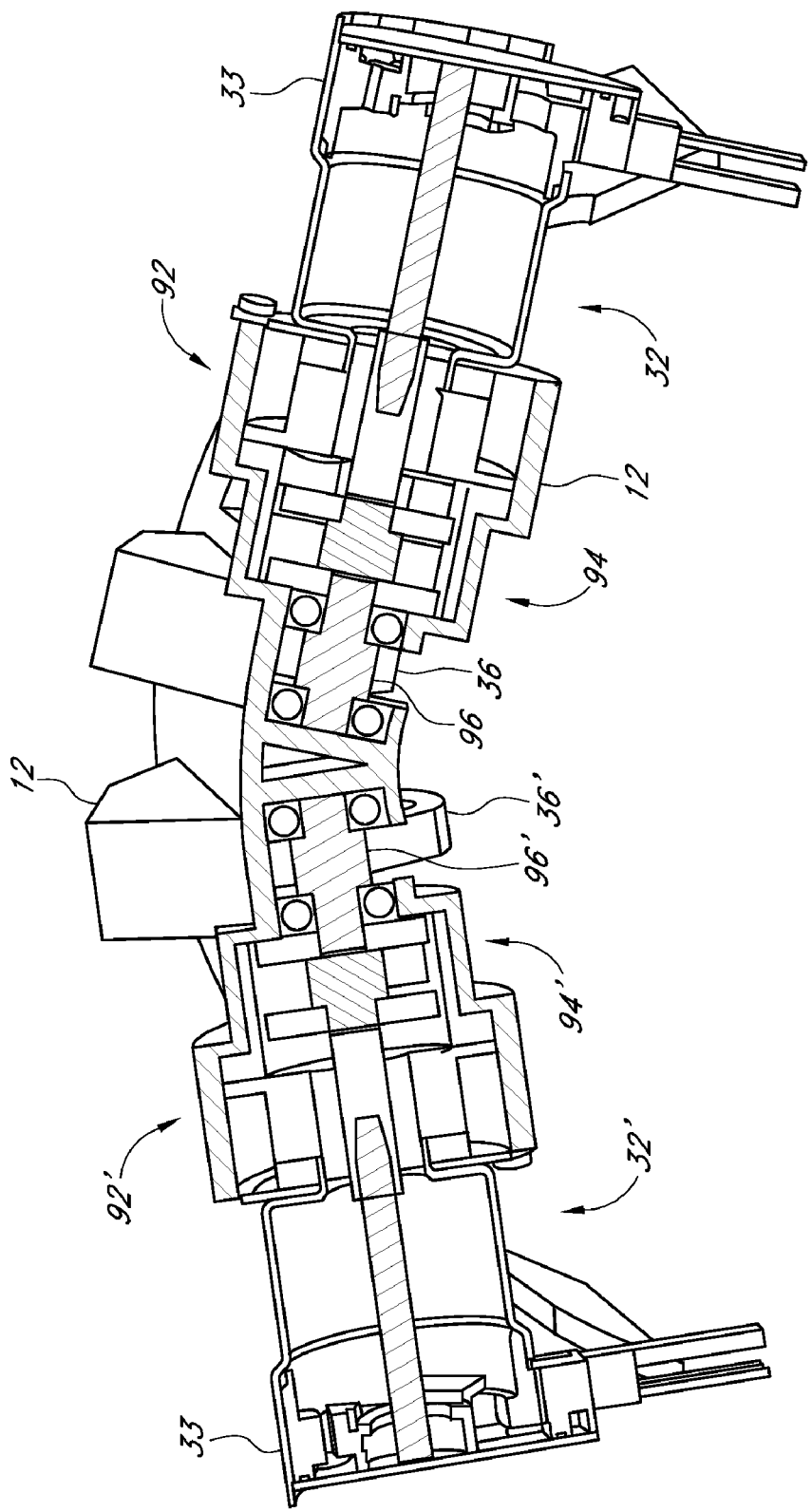
FIG. 10 shows a further section through the actuating mechanism of FIG. 8, with only an upper part of the actuating mechanism being illustrated, taking into consideration an additional transmission housing.

FIG. 10 shows a further sectioned illustration through the actuating drives 32, 32' of FIG. 8, with the transmission housing 12 additionally being illustrated here, too, in order to highlight the compact design.

Here, the actuating drives 32 have in each case one motor 33, in particular an electric motor, a brake 92 which is coupled thereto, and an intermediate gearing 94 (for example planetary gear set, spur gear mechanism etc.) which is coupled to the brake 92. The drive pinions 96 of the intermediate gearing are preferably of toothed design. The pinion 96 thereby meshes with the cam segment 36.

It can also be clearly seen in the illustration of FIG. 10 that the components of the actuating mechanism, according to the invention, project out of the housing 12, which is otherwise of conventional design, only to an insignificant extent.

FIGS. 11a to 11c show three variants of an additional force compensation device 100, 100' and 100", which are coupled in each case to the cam segment 36.

Each of the force compensation devices comprises a spring element 102 which is coupled with one of its ends to the cam segment 36. In the variants of FIGS. 11a and 11c, the other end of the spring element 102 is fixed to the housing 12. In the variant of FIG. 11b, the housing 12 has an opening, such that the other end of the spring element 102 may also be fixed outside the housing 12.

In the variants of FIGS. 11a to 11c, the spring elements 102 are preloaded so as to assist a rotational movement of the cam segment 36 in the engagement rotational direction 50 (in this case anti-clockwise). It is thereby ensured that the force which must be applied by the motor 33 to engage a clutch is lower than that which the motor 33 must apply if the force compensation device 100 is not provided.

Figure 12B:
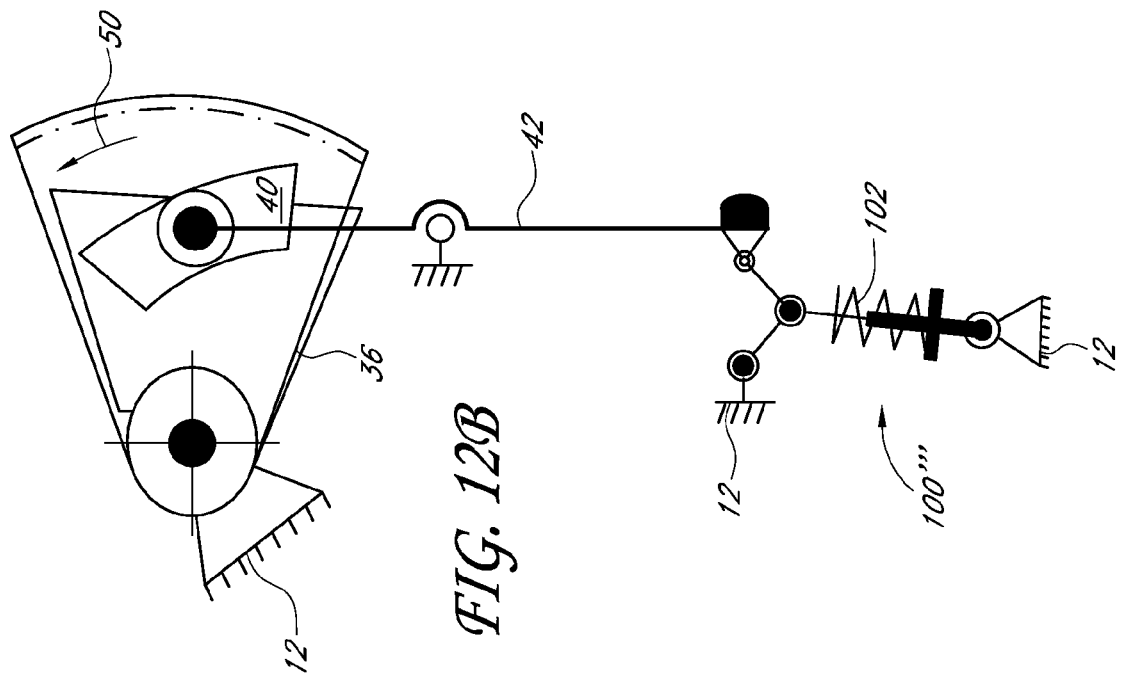
FIGS. 12a and b show two further variants of a force compensation device.
Figure 12A:
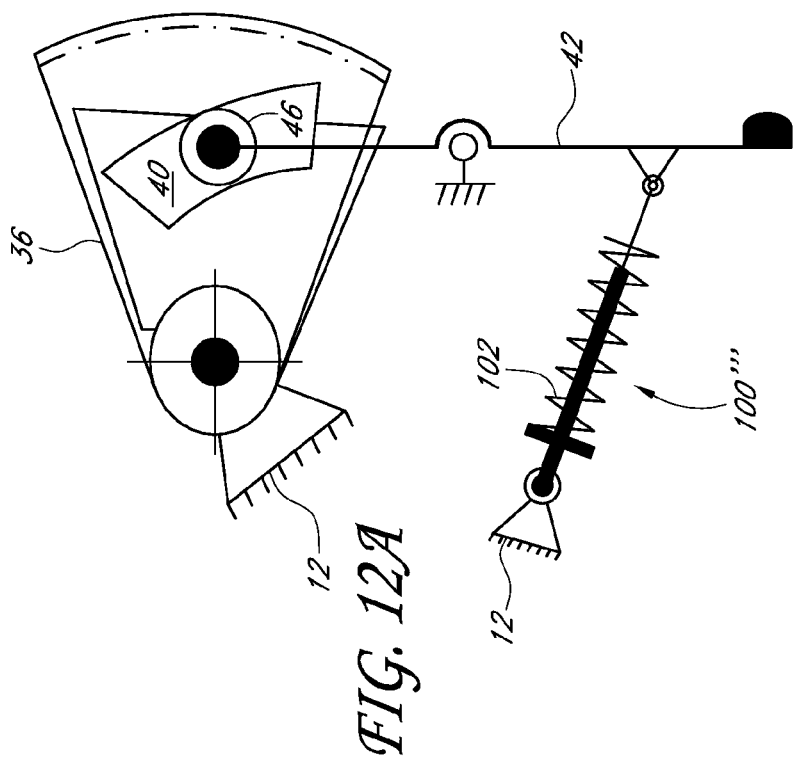

FIGS. 12a and 12b show two further variants of a force compensation device 103' and 104'. The force compensation devices 103' and 104' engage on the engagement fork 42, in particular on the lower part thereof.

Figure 13:
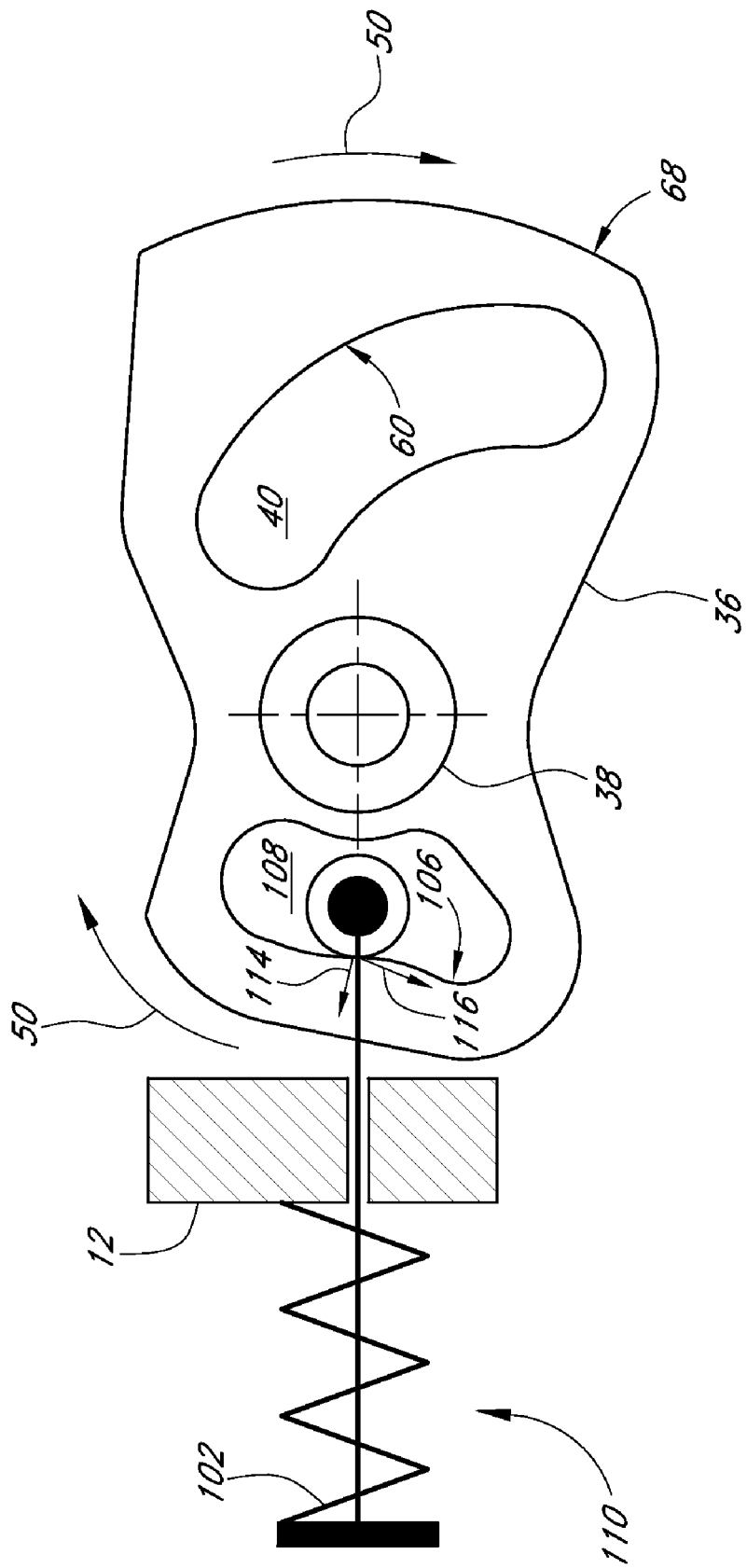
FIG. 13 shows a further variation of the force compensation device, which is realized on a cam segment.

FIG. 13 shows a further refinement of a cam segment 36 with an integrated force compensation cam 106, which in this case constitutes a radially outer flank of a further recess 108 in the elongated body of the cam segment 36. The cam segment 36 has an additional wing in relation to the cam segments 36 described above, with the additional wing, which comprises the recess 108, being situated opposite the body of the previous cam segments 36.

Here, the force compensation device is denoted by 110 and is of similar design to the force compensation device 100' of FIG. 11b, that is to say is guided through an opening in the housing 12. The pressure spring 102 is preloaded between a tension anchor 112 and the housing 102. It should, however, be mentioned here that the tension anchor 112 need not necessarily be guided through an opening in the housing 12, but rather may also be fixed by means of rollers which are mounted so as to be fixed with respect to the housing.

The force compensation curve 106 is of similar design to the contact flank 60. Said force compensation curve may however also be of some other design. A force introduction direction is predefined by the linear guidance of the tension anchor. The force acting on the force compensation curve 106 can therefore be broken down into a radial component 114 and a component 116 which runs in the circumferential direction. The circumferential component 116 assists the actuating drive during a rotational movement of the cam segment 36 in the engagement rotational direction 50.

Figure 14:
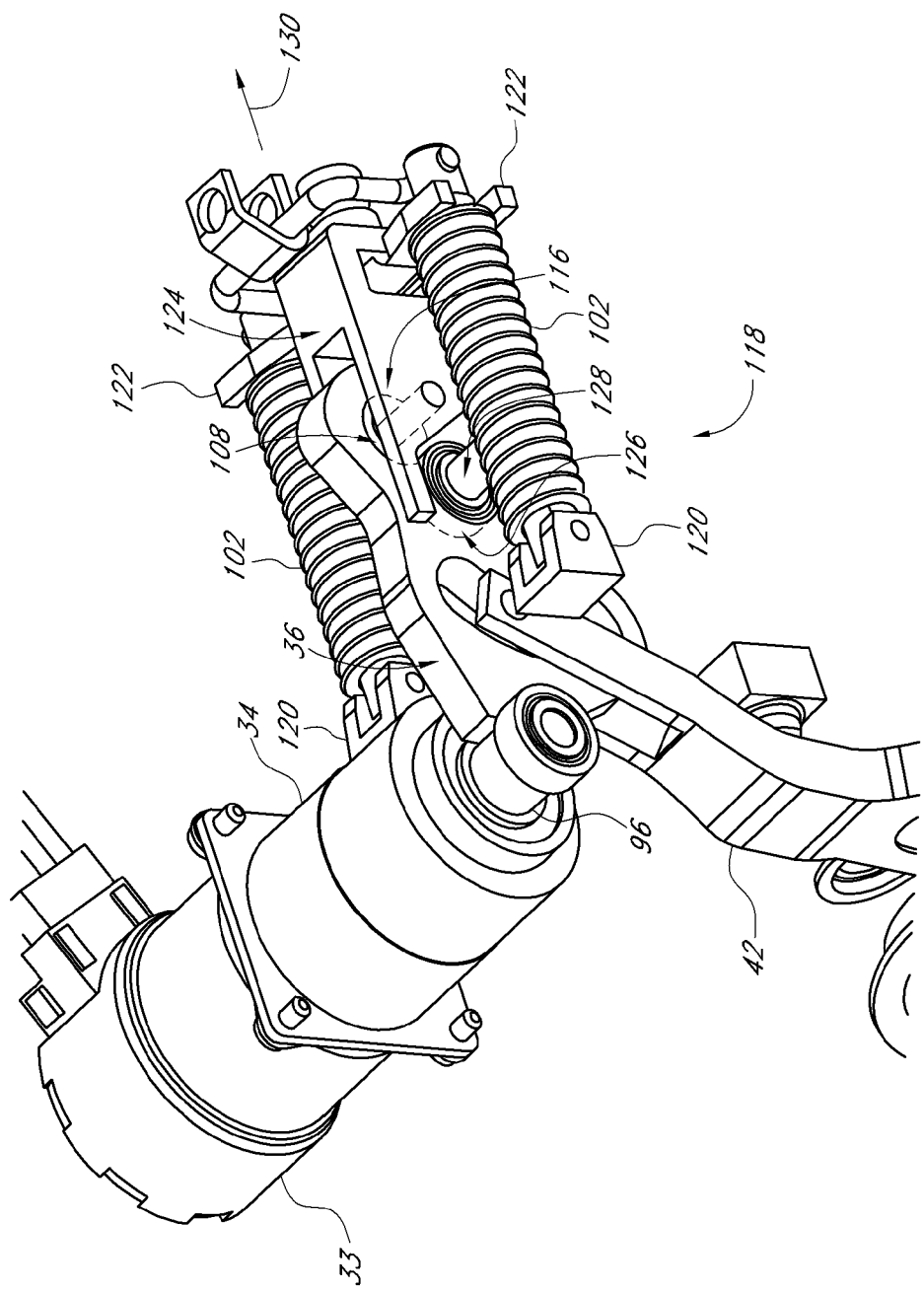
FIG. 14 shows a perspective view of another force compensation device.

FIG. 14 shows a further refinement of a force compensation device 118 which interacts with a cam segment 36 similar to that of FIG. 13. The cam segment 36 of FIG. 14 likewise has an additional recess 108 with a corresponding force compensation curve 116. The force compensation device 118 comprises two pressure springs 102 which are braced in each case between a bearing point 120, which is fixed with respect to the housing, and a tension bracket 122. The tension brackets 122 are connected to a tension anchor 124 which is supported by means of a bearing roller 126 which is provided at both sides of the cam segment 36 and which runs on a bolt 128 which is fixed with respect to the housing. The force compensation device 118 generates a substantially radially outwardly directed force 130.

What is claimed is:

1. An actuating mechanism for engaging and disengaging a separating clutch of a single-clutch or multiple-clutch transmission, which has a housing, for a motor vehicle, comprising:
an actuating drive;
a cam segment having a curved slot with a radially inward facing contact flank and being rotatable about a first bearing, said first bearing being fixed with respect to the housing, and being rotatable by the actuating drive in an engagement rotational direction or a disengagement rotational direction;

an engagement fork which is rotatable about a second bearing, said second bearing being fixed with respect to the housing, and which is coupled at one side of the fork to the cam segment by means of a cam follower and which can be coupled on an opposite side of the fork to the separating clutch in such a way that the separating clutch is closed in the event of a rotation of the cam segment in the engagement rotational direction and the separating clutch is opened in the event of a rotation of the cam segment in the disengagement rotational direction;

with the cam follower engaging into the curved slot and being guided by a contour of the contact flank in the event of a rotation of the cam segment; and with the contour being shaped such that the cam follower is offset in a radial direction of the cam segment in the event of an actuation of the actuating drive.

2. The actuating mechanism of claim 1, wherein the curved slot runs substantially in a circumferential direction of the cam segment and has a varying radius.

3. The actuating mechanism of claim 1, wherein, in an installed state of the actuating mechanism, the contact flank is in contact with the cam follower at all times on account of a preload of the separating clutch, which preload acts in a disengagement direction of the separating clutch.

4. The actuating mechanism of claim 3, wherein the contact flank substantially has a cross section in the shape of a section of a spiral.

5. The actuating mechanism of claim 4, wherein the spiral is of an Archimedes type.

6. The actuating mechanism of claim 3, wherein the contact flank has a continuous operating section, the operating section having, at one end, an engagement point and, at another end, a disengagement point.

7. The actuating mechanism of claim 6, wherein the contact flank has, in the region of the engagement point, a convexity.

8. The actuating mechanism of claim 7, wherein the convexity has a constant radius.

9. The actuating mechanism of claim 6, wherein a flank section having an elevation adjoins the operating section in the disengagement direction, with the flank section having the elevation subsequently merging into a locking section.

10. The actuating mechanism of claim 9, wherein the locking section has a constant radius.

11. The actuating mechanism of claim 1, further comprising a force compensation device which couples to a component of the actuating mechanism, and which assists a rotation of the cam segment in the engagement rotational direction.

12. The actuating mechanism of claim 11, wherein the force compensation device couples to one of the cam segment and the fork.

13. The actuating mechanism of claim 11, wherein the force compensation device has a spring element which is preloaded counter to the disengagement rotational direction and which can be coupled at one end to the housing and at the opposite end to one of the cam segment and the fork.

14. Actuating mechanism of claim 13, wherein, when the spring element is coupled to the cam segment, the cam segment has, on an outer surface where the spring element is coupled on, a rising elevation in order to exert the greatest possible force on the cam segment in the region of the engagement point in the event of a rotation in the engagement rotational direction.

15. The actuating mechanism of claim 1, wherein the cam follower is a fork roller which is rotatably fixed between two prongs of the fork and whose diameter is selected such that the fork roller can be moved with a predefined degree of play along the contact flank in the curved slot.

16. The actuating mechanism of claim 1, wherein the actuating drive has a motor, and a brake.

17. The actuating mechanism of claim 16, wherein the motor is an electric motor.

18. The actuating mechanism of claim 16, wherein the actuating drive also has an intermediate gearing, and a pinion.

19. The actuating device of claim 18, wherein the intermediate gearing is one of a planetary gear set and a spur gear mechanism, and the pinion has an encircling toothed ring.

20. The actuating mechanism of claim 18, wherein the brake is arranged in parallel with respect to the intermediate gearing by means of a spur toothing.

21. The actuating mechanism of claim 1, wherein the cam segment is a circular segment whose circular arc has a toothing.

22. The actuating mechanism of claim 1, wherein the cam segment is connected to a Bowden cable which can be mechanically actuated from outside the housing.

23. The actuating mechanism of claim 1, wherein, in the installed state of the actuating mechanism, the actuating drive is arranged substantially in a radial direction relative to an actuation axle of the separating clutch.

24. An actuating mechanism for engaging and disengaging a separating clutch of a single-clutch or multiple-clutch transmission, which has a housing, for a motor vehicle, comprising:

an actuating drive;

a cam segment having a curved recess and being rotatable about a first bearing, said first bearing being fixed with respect to the housing, and being rotatable by the actuating drive in an engagement rotational direction or a disengagement rotational direction;

an engagement fork which is rotatable about a second bearing, said second bearing being fixed with respect to the housing, and which is coupled at one side of the fork to the cam segment by means of a cam follower and which can be coupled on an opposite side of the fork to the separating clutch in such a way that the separating clutch is closed in the event of a rotation of the cam segment in the engagement rotational direction and the separating clutch is opened in the event of a rotation of the cam segment in the disengagement rotational direction;

with the cam follower engaging into the curved recess and being guided by a contour of the curved recess in the event of a rotation of the cam segment; and with the contour being shaped such that the cam follower is offset in a radial direction of the cam segment in the event of an actuation of the actuating drive, wherein the recess has a contact flank which, in an installed state of the actuating mechanism, is in contact with the cam follower at all times on account of a preload of the separating clutch, which preload acts in a disengagement direction of the separating clutch.

25. An actuating mechanism for engaging and disengaging a separating clutch of a single-clutch or multiple-clutch transmission, which has a housing, for a motor vehicle, comprising:

an actuating drive;

a cam segment having a curved recess and being rotatable about a first bearing, said first bearing being fixed with respect to the housing, and being rotatable by the actuating drive in an engagement rotational direction or a disengagement rotational direction;

an engagement fork which is rotatable about a second bearing, said second bearing being fixed with respect to the housing, and which is coupled at one side of the fork to the cam segment by means of a cam follower and which can be coupled on an opposite side of the fork to the separating clutch in such a way that the separating clutch is closed in the event of a rotation of the cam segment in the engagement rotational direction and the separating clutch is opened in the event of a rotation of the cam segment in the disengagement rotational direction;

with the cam follower engaging into the curved recess and being guided by a contour of the curved recess in the event of a rotation of the cam segment;

with the contour being shaped such that the cam follower is offset in a radial direction of the cam segment in the event of an actuation of the actuating drive; and a force compensation device which couples to a component of the actuating mechanism, and which assists a rotation of the cam segment in the engagement rotational direction, wherein the force compensation device has a spring element which is preloaded counter to the disengagement rotational direction and which can be coupled at one end to the housing and at the opposite end to one of the cam segment and the fork, wherein, when the spring element is coupled to the cam segment, the cam segment has, on an outer surface where the spring element is coupled on, a rising elevation in order to exert the greatest possible force on the cam segment in the region of the engagement point in the event of a rotation in the engagement rotational direction.

* * * * *